UNITED STATES PATENT OFFICE.

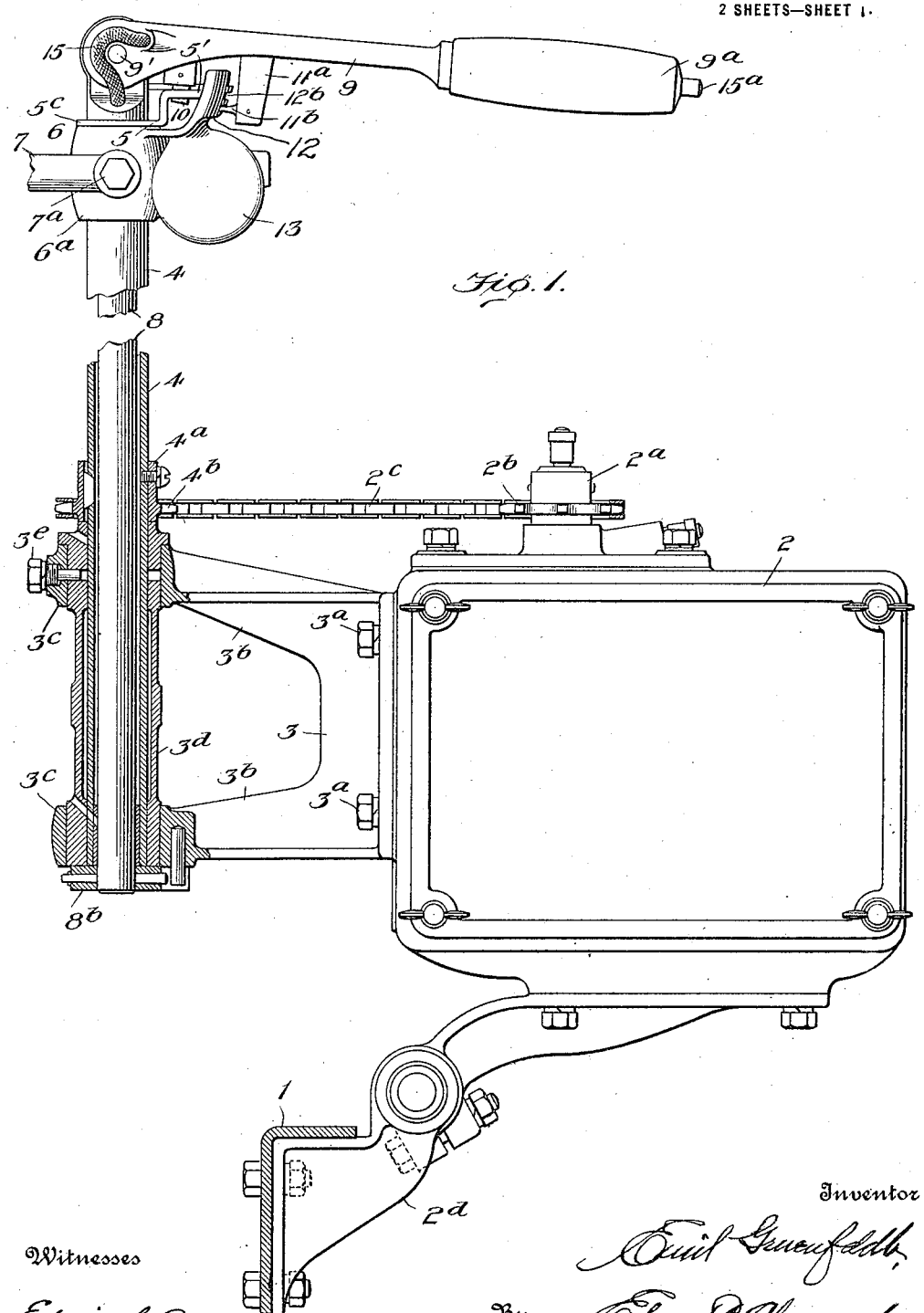

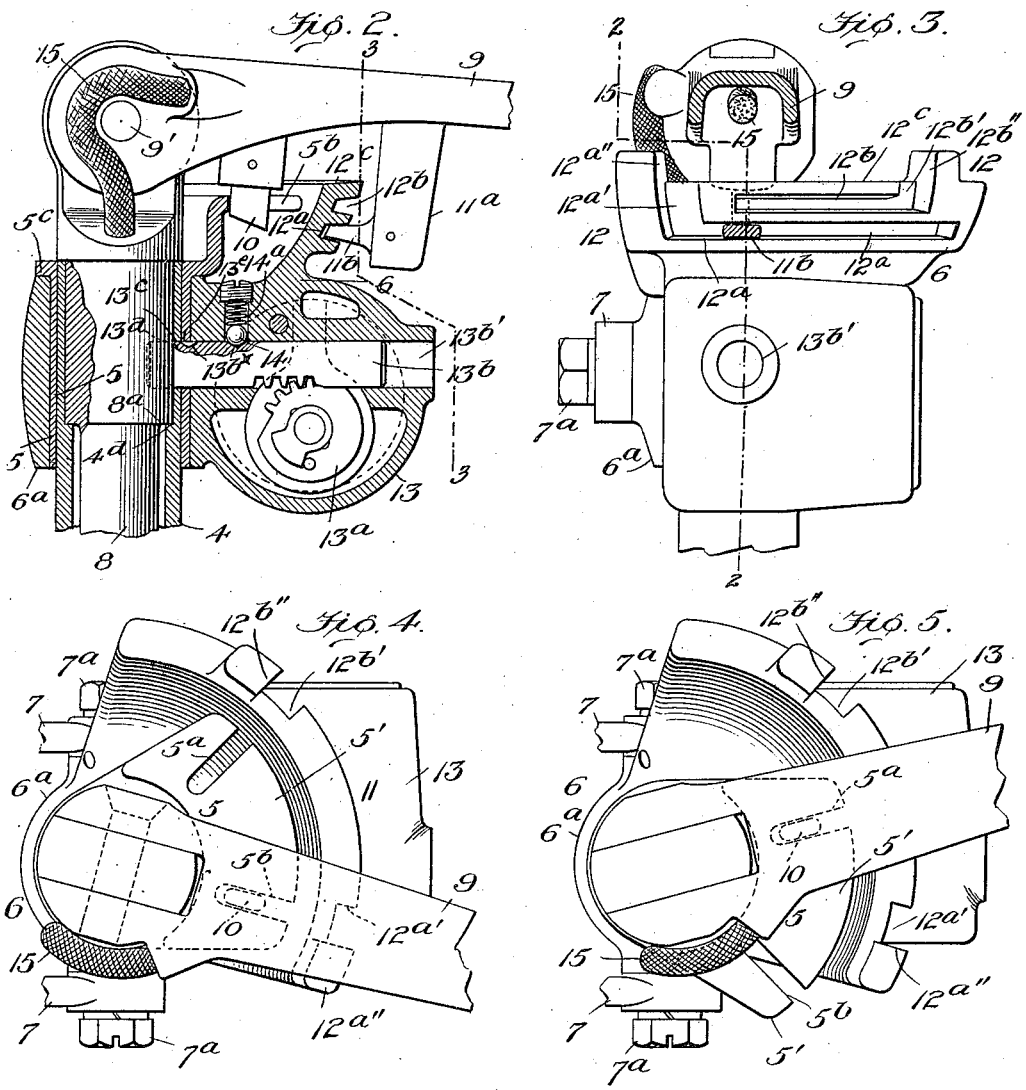

EMIL GRUENFELDT, OF CLEVELAND, OHIO, ASSIGNOR TO THE BAKER MOTOR VEHICLE COMPANY, OF CLEVELAND, OHIO, A CORPORATION OF OHIO.

OPERATING MECHANISM.

1,322,692.  Specification of Letters Patent.  Patented Nov. 25, 1919.

Application filed February 26, 1913, Serial No. 750,821. Renewed September 9, 1916. Serial No. 119,251.

*To all whom it may concern:*

Be it known that I, EMIL GRUENFELDT, a subject of the Emperor of Germany, residing at Cleveland, in the county of Cuyahoga and State of Ohio, have invented certain new and useful Improvements in and Relating to Operating Mechanism, of which the following is a specification.

This invention relates to operating mechanism for motor vehicles, particularly operating mechanism for the control member of a motor. This invention is especially adapted for use in connection with an electric controller, the circuit controlling member of which may be moved in opposite directions to change the direction of rotation of the motor armature shaft.

I have illustrated my invention as applied to the controller for an electric vehicle, which in ordinary use is driven forwardly and rearwardly by an electric motor.

For the purpose of illustration I have, in the accompanying drawings, shown and herein described one form of appliance embodying my invention.

Figure 1 is an elevation, partly in section, of a portion of the vehicle frame, the controller and the controller operating mechanism embodying my invention.

Fig. 2 is a sectional view through the controller mechanism on the line 2—2 of Fig. 3.

Fig. 3 is a view on the line 3—3 of Fig. 2.

Fig. 4 is a top plan view showing the parts in neutral position and the control lever in position to operate the controller for driving the vehicle forwardly.

Fig. 5 is a top plan view showing the position of the control lever when the vehicle is being driven rearwardly.

In the drawings, 1 indicates a portion of a vehicle frame, 2 indicates a casing or housing within which is mounted a controller for controlling the electric motor (not shown) of the vehicle, having a movable circuit opening and closing member $2^a$, adapted when moved in one direction from neutral position to close the circuit and cause the armature shaft of the electric motor to rotate in one direction; and when moved in the opposite direction from neutral position to close the circuit and cause the armature shaft of the electric motor to rotate in the reverse direction. The movable member $2^a$ of the controller is preferably mounted on a shaft which extends outside of the casing 2. The movable member $2^a$ is provided with a sprocket $2^b$ to receive a chain $2^c$, by which it is rotated in either direction. The casing 2 may be mounted in a well known manner on the frame 1 by one or more brackets $2^d$.

3 indicates a supporting frame preferably fixed by bolts $3^a$ to one side of the casing 2. Extending from the frame 3 is a pair of arms $3^b$, which, at their free ends, are provided with collars $3^c$ arranged to support a bearing sleeve $3^d$. The sleeve $3^d$ may be fixed to one of the collars by a bolt $3^e$, the inner end of which extends into an opening formed in the sleeve.

4 indicates a sleeve shaft rotatably mounted in the bearing sleeve $3^d$. The sleeve shaft 4 extends upwardly from the supporting frame 3, the latter being preferably arranged so as to support the sleeve shaft 4 at one side of the driver's seat in the vehicle in convenient position for operation as will be later described. $4^a$ indicates a collar surrounding and fixed to the sleeve shaft 4. The collar $4^a$ carries a drive sprocket $4^b$, preferably integrally formed thereon. The sprocket chain $2^c$ extends around the sprocket $4^b$ and thus transmits its rotary motion to the sprocket $2^b$ whenever the sleeve shaft 4 is rotated.

5 indicates a tubular end piece arranged at the upper end of and fixed to the sleeve shaft 4 in any desired manner. The tubular end piece 5 is provided at its upper end with a segmental flange $5'$. At $5^a$, $5^b$, the flange $5'$ is formed with a pair of openings or slots, preferably spaced from each other a distance of approximately 60° on an arc struck from the axis of the sleeve shaft 4. The slots $5^a$, $5^b$, are preferably elongated and extend inwardly in a radial direction from the outer edge of the flange $5'$.

6 indicates a supporting member for the upper end of the sleeve shaft 4. The member 6 preferably comprises a collar $6^a$, in which the end piece 5 is mounted, and a pair of arms projecting laterally from the adjacent part of the vehicle frame 1. The member 6 is arranged between the free ends of the arms 7 and rigidly connected thereto, as by bolts $7^a$. The piece 5 may be provided with an annular shoulder $5^c$ which engages the collar $6^a$ and prevents endwise movement of the tubular piece 5 downwardly.

8 indicates a shaft rotatably mounted within the sleeve shaft 4. At $8^a$ the shaft is enlarged to form an annular shoulder which has bearing in the rabbeted portion 4$^d$ of the sleeve shaft 4. 9 indicates a lever pivoted at 9' on a horizontal axis at its inner end to the upper end of the shaft 8, whereby it may swing in vertical planes. The lever 9 is provided with a handle 9$^a$ surrounding the portion adjacent to its free end.

The shaft 8 may extend entirely through the sleeve 4 and have keyed to it at its lower end a ring 8$^b$, which has bearing on the lower end of the bearing 3$^d$ and coöperates with the shoulder 8$^a$ to prevent endwise movement of the shaft 8.

As will be clearly understood from the foregoing description, the shaft 8 and the pivot connection between it and the lever 9 permits the latter to be freely oscillated toward and from the driver of the vehicle and also to be raised and lowered in vertical planes.

10 indicates a lock pin fixed to and depending from the lever 9 and adapted to be inserted or projected into either one of the slots 5$^a$, 5$^b$, whenever the lever 9 is moved into a position with the lock pin in registry with one of said slots. When the lock pin 10 is inserted into one of the slots 5$^a$, 5$^b$, of the flange 5', it serves as a connection between the shaft 4 and lever 9, whereby the movement of the latter will rotate the shaft 4 in one direction or the other. The construction and arrangement of the connections between the controller shaft 2$^a$ and the shaft 4 are preferably such that when the latter is rotated in anti-clockwise direction (as viewed in Fig. 4), the motor armature shaft will drive the vehicle in a forward direction; hence, when the lever 9 is moved into proper position and swung downwardly to insert the lock pin 10 in the slot 5$^b$, and then swung or moved away from the driver about the axis of the shaft 8, the controller 2 will be operated so that the motor vehicle will be driven forwardly; also, when the lever 9 is moved into a position with the lock pin 10 above the slot 5$^a$ and swung downwardly to insert the pin 10 therein, and is then moved toward the driver about the axis of the shaft 8, the controller will be operated so that the motor vehicle will be driven rearwardly.

11 indicates as an entirety means for guiding and controlling the movement of the lever 9. The means 11 are preferably interposed between the lever 9 and the supporting member 6.

Of the guide and control means 11, 11$^a$ indicates an arm fixed to and depending from the lever 9. 11$^b$ indicates a guide pin preferably extending laterally in a direction toward the axis of the shaft 8. This pin 11$^b$ may be rigidly connected to the arm 11$^a$ in a well known manner. 12 indicates a guide plate in which are formed a pair of guides, 12$^a$, 12$^b$, preferably curved about the axis of the shaft 8 and extending horizontally and parallel to each other. These guides are arranged to receive the guide pin 11$^b$ and thus permit movement of the lever 9 forwardly and rearwardly about the axis of the shaft 8. The guides are provided with upper and lower walls which guide the lever horizontally, but prevent it from moving either upwardly or downwardly. 12$^{a\prime}$, 12$^{b\prime}$ indicate gate-ways or slots formed in the walls of the guide plate 12. The gateways 12$^{a\prime}$, 12$^{b\prime}$, extend downwardly from the upper edge of the plate 12, and at their lower ends they merge into or communicate with the guides 12$^a$, 12$^b$, respectively. As shown in the drawings, the gate-way 12$^{a\prime}$, is arranged at and communicates with the rear end of the guide 12$^a$, whereas the gateway 12$^{b\prime}$ is arranged at and communicates with the front end of the guide 12$^b$. The gate-ways 12$^{a\prime}$, 12$^{b\prime}$ provide a passage way for the guide pin 11$^b$, so that when the lever 9 is swung downwardly to insert the lock pin 10 into one of the slots 5$^a$, 5$^b$, the guide pin 11$^b$ may enter one of the guides 12$^a$, 12$^b$, and then move horizontally therein to operate the controller. The opposite end walls of the guides 12$^a$, 12$^b$, form stops to limit the movement of the guide pin in either direction.

As shown at 12$^c$, the wall of the plate 12 is cut away to form a slide on which the guide pin 11$^b$ may ride when being moved toward or from one of the gate-ways 12$^a$, 12$^b$; also, the opposite end walls of the cut away portion 12$^c$ form shoulders or stops 12$^{a\prime\prime}$, 12$^{b\prime\prime}$, which limit the movement of the guide pin 11$^b$. These stops facilitate the operation of the lever 9, because they readily indicate to the driver when he has moved the lever to that position which will permit him to swing the lever downwardly and connect it with the sleeve shaft 4.

The guide plate 12 preferably comprises a section of a spherical shell, the axis of which is the axis on which the lever swings in horizontal and vertical directions. This form of construction provides for the guide pin 11$^b$ suitable curved guides struck from the axis on which the lever 9 swings. The plate 12 is preferably formed integral with the supporting member 6.

As will be understood from the drawings, the gate ways 12$^{a\prime}$, 12$^{b\prime}$ are arranged approximately 60° apart about the axis of the shaft 8, and on radial lines cutting the slots 5$^a$, 5$^b$. From this construction and arrangement it will be apparent that when the lever 9 is moved horizontally to the position which will permit the guide pin 11$^b$ to enter either one of the gate ways 12$^{a\prime}$, 12$^{b\prime}$, the lock pin 10 will be superposed above the adjacent slot 5$^a$ or 5$^b$.

13 indicates a hollow casing the walls of which are preferably formed integral with the supporting member 6. This casing is adapted to inclose a key-lock mechanism 13$^a$ of any suitable form. 13$^b$ indicates a keeper slidably mounted in a guide opening 13$^{b\prime}$ in the casing 13. The inner end of the keeper 13$^b$ extends through openings 13$^c$, 13$^e$, 13$^d$, formed in the shaft 4, end piece 5 and shaft 8, respectively, which openings are arranged to register with each other and with the opening 13$^{b\prime}$ when the shaft 4 is in neutral position and the lever 9 positioned to insert the lock pin 10 in the slot 5$^b$.

14 indicates a spring operated device, such as a ball, mounted in an opening 14$^a$ of the member 6 and adapted to engage the walls of the notches 13$^{bx}$ formed in the keeper 13$^b$ to normally maintain the same in either a locked or unlocked position.

15 indicates an insulated wire forming part of an electric bell circuit. This wire leads through the lever 9, as shown in Fig. 3, to a pair of contacts (not shown) within the handle 9$^a$. The contacts are operated by a push button 15$^a$, mounted in the free end of the handle, to complete the circuit.

In operation, assuming that it is desired to drive the vehicle forwardly, the lever 9 is moved rearwardly or toward the driver until the guide pin 11$^b$ engages the stop 12$^{a\prime\prime}$. The driver then moves the lever 9 downwardly, causing the guide pin 11$^b$ to move through the gate way 12$^{a\prime}$ into the guide 12$^a$ and the lock pin 10 to enter the slot 5$^b$. The lever 9 is now connected to the sleeve shaft 4 and may be moved forwardly to connect in the current to drive the vehicle at any desired speed according to the distance the lever 9 is operated. In this latter operation, the guide pin 11$^b$ slides through the guide 12$^a$ and the walls thereof prevent the swinging of the lever vertically during such movement. To stop the vehicle, the lever 9 is returned to neutral position, or at the rear end of the guide 12$^a$.

If now it is desired to drive the vehicle rearwardly, the lever is elevated, the guide pin moving upwardly through the gate way 12$^{a\prime}$ to remove the lock pin 10 with the slot 5$^b$. The lever 9 is then moved forwardly until the guide pin engages the stop 12$^{b\prime\prime}$ after which it is swung downwardly. This latter operation has the effect of moving the guide pin through the gate way 12$^{b\prime}$ and the lock pin 10 into the slot 5$^a$. If now the lever 9 is moved rearwardly the current in the motor will be reversed, causing the vehicle to be driven rearwardly.

From the foregoing description it will be seen that I have provided a construction in which the operation of the vehicle both forwardly and rearwardly is controlled by the movement of a lever throughout a relatively short arc, so that driving of the car in either direction can be accomplished without changing one's position.

By my invention, the control lever is guided and controlled in its movements in either direction, so that if for instance the driver desires to go forward and has moved the pin 11$^b$ into the gate 12$^{a\prime}$, he cannot move the lever 9 in any direction except forwardly through the guide 12$^a$. Again, when the lever 9 is once connected to the shaft 4 and the latter operated, it cannot be disconnected therefrom except by movement back to starting position, where the current is entirely cut off. Furthermore, by the use of my invention it is impossible, when shutting off the current, to reverse the motor by mistake because it is always necessary, after moving the lever to neutral position, to disconnect it from the shaft 4 by an upward movement, then move it forward to the position wherein the pin 10 registers with the slot 5$^a$ and finally swing the lever downwardly. As the guides 12$^a$, 12$^b$, are not connected together and each has but one open end, it will be seen that the pin 11$^b$ cannot be changed from one guide to the other except by first moving it back to the open end of the guide in which it is at any time located and then by removing it therefrom, as just described.

From the foregoing description it will also be seen that the lever 9 is movable to operative and non-operative positions; when moved to operative position the vehicle may be operated as desired, but when the lever is moved to the non-operative position it is freely movable about its pivot.

As the pin 11$^b$ is fixed to the lever 9, the latter is guided and controlled in its movements to turn on the current to drive the vehicle as desired.

To those skilled in the art of making apparatus or mechanism of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. In an operating mechanism, the combination of a support, a hollow shaft mounted thereon, a second shaft mounted within said hollow shaft, a lever pivoted to said second shaft and swingable in horizontal and vertical directions, interlock means between said lever and said hollow shaft, and means for guiding and controlling the movements of said lever.

2. In an operating mechanism, the combination of two shafts, means for supporting said shafts to swing independently on an axis coincident with each other, a lever pivoted to one of said shafts and swingable in horizontal and vertical directions, interlock means between said lever and the other of said shafts, and guide and control means for said lever.

3. In an operating mechanism, the combination of a support, a hollow shaft mounted thereon, a second shaft mounted within said hollow shaft, a lever pivoted to said second shaft and swingable in horizontal and vertical directions, interlock means between said lever and said hollow shaft, a guide pin carried by said lever, and a guide plate having guides through which said guide pin moves for guiding and controlling the movements of said lever.

4. In an operating mechanism, the combination of a pair of shafts vertically mounted on said support and movable relative to each other independently, a lever pivoted to one of said shafts to swing in vertical directions, interlock means between said lever and the other of said shafts, a guide device carried by said lever and a guide plate having guides through which said guide device moves for guiding and controlling the movements of said lever.

5. In an operating mechanism, the combination of a support, a shaft mounted thereon and provided with a flange, a lever, means for supporting said lever to rotate on an axis coincident with the axis of said shaft, means for pivoting said lever on said supporting means on an axis arranged at right angles to the axis of said shaft, interlock means between said lever and said flange for connecting said lever and flange together, and means for guiding and controlling the movements of said lever about the axis of said shaft.

6. In an operating mechanism, the combination of a support, a rotatable member mounted on said support, a lever, means for supporting the inner end of said lever to swing horizontally on an axis substantially coincident with the axis of said rotatable member, pivot means between said lever and said supporting means permitting the lever to swing vertically, a lock device arranged to engage said member for connecting the lever thereto, whereby the rotatable member may be rotated by said lever, and means for guiding and controlling the movements of said lever in horizontal directions.

7. In an operating mechanism, the combination with a controller, of a pair of members independently movable relatively to each other, drive connections between one of said members and said controller, a lever pivoted to the other of said members and movable in horizontal and vertical directions, means for connecting said lever to the movable member connected with said controller, and means for guiding and controlling the movements of said lever.

8. In apparatus of the character described, the combination of a pair of relatively movable members, a lever mounted to swing on an axis coinciding with the axis of the movable member of said pair of members and also at right angles thereto, and a pair of elements carried by said lever and arranged to engage said members to connect said lever thereto.

9. In apparatus of the character described, the combination of a stationary member, a movable member, a lever mounted to swing on an axis coinciding with the axis of said movable member and also at right angles thereto, and a pair of elements carried by said lever and arranged to engage said members to connect said lever thereto, the connection between said lever and said stationary member operating to prevent separation of the connection between said lever and said movable member while being moved about the axis of said member.

10. In an operating mechanism, the combination with a controller, of a movable member, connections between said movable member and said controller for operating the latter, a lever horizontally movable about the axis of said member to actuate it and also vertically movable on an axis which substantially intersects the axis of said rotatable member for connection thereto and disconnection therefrom, and means for guiding and controlling said lever when moved in one of said directions.

11. In an operating mechanism, the combination with a controller, of a movable member, connections between said movable member and said controller for operating the latter, a lever horizontally movable about the axis of said member to actuate it and also vertically movable on an axis which substantially intersects the axis of said rotatable member for connection thereto and disconnection therefrom, and means for guiding and controlling said lever when moved horizontally.

12. In an operating mechanism, the combination with a controller, of a movable member, connections between said movable member and said controller for operating the latter, a lever horizontally movable about the axis of said member to actuate it and also vertically movable on an axis which substantially intersects the axis of said rotatable member for connection thereto and disconnection therefrom, and means for locking the lever in operative relation to said rotatable member while being moved horizontally.

13. In an operating mechanism, the combination with a support and a controller, of a movable member, connections between said movable member and said controller for operating the latter, a lever horizontally movable about the axis of said member to actuate it and also movable vertically on an axis which substantially intersects the axis of said rotatable member for connection thereto and disconnection therefrom, and means interposed between said lever and said support for locking the lever in operative relation to said rotatable member while being moved horizontally.

14. In an operating mechanism, the combination with a controller, of a pair of members independently movable relatively to each other, drive connections between one of said members and said controller, a lever pivoted to the other of said members and movable in horizontal and vertical directions, means for connecting said lever to the movable member connected with said controller when said lever is moved vertically in one direction, a plate having horizontal guides and a gate way leading to each of said guides, and a device carried by said lever and movable through said guides, the said gateways permitting the said device to enter each of said guides.

15. In an operating mechanism, the combination with a controller, of a pair of members independently movable relatively to each other, drive connections between one of said members and said controller, a lever pivoted to the other of said members and movable in horizontal and vertical directions, means for connecting said lever to the movable member connected with said controller when said lever is moved vertically, a plate having a pair of horizontally extending guides and gateways leading to the opposite ends of said guides, and a guide pin carried by said lever, the said gate ways permitting the downward movement of said lever for the insertion of the guide pin into each of said guides.

16. In an operating mechanism, the combination with a controller, of a pair of members independently movable relatively to each other, drive connections between one of said members and said controller, a lever pivoted to the other of said members and movable in horizontal and vertical directions, means for connecting and disconnecting said lever to the movable member connected with said controller when said lever is moved vertically, a plate having a pair of guides extending parallel to each other and gate ways, one for each guide, leading to the opposite ends of said guides, and a guide pin carried by said lever and movable from end to end of each of said guides, and a stop for limiting the movement of said guide pin at the open end of each of said gate ways.

17. In an operating mechanism, the combination with a controller, of a pair of members independently movable relatively to each other, drive connections between one of said members and said controller, a lever, detachable connections between said lever and the movable member connected to said controller, means for pivoting said lever on the other movable member to swing in vertical directions, whereby said lever can be connected to and disconnected from said movable member, and means permitting the swinging of said lever to connect in said detachable connections when the lever is in predetermined positions but preventing disconnection of said lever during its movement to operate the said controller.

18. In apparatus of the class described, the combination of an operating lever pivotally mounted to swing about axes at right angles to each other, a shaft to be oscillated, interlocking power transmitting devices, one element of which is carried by said shaft and is movable therewith and the other element of which is carried by said lever and is movable therewith and into and out of engagement with said element carried by said shaft, said lever being free to swing about the axes of its respective pivotal mountings independently of said shaft when said interlocking element is disengaged, and means for guiding said lever when said interlocking elements are engaged and said lever is moved to rotate said shaft in either direction.

19. In apparatus of the class described, the combination of an operating lever pivotally mounted to swing about axes at right angles to each other, a shaft to be oscillated, interlocking power transmitting devices, one element of which is carried by said shaft and is movable therewith and the other element of which is carried by said lever and is movable therewith and into and out of engagement with said element carried by said shaft, said lever being free to swing about the axes of its respective pivotal mountings independently of said shaft when said interlocking element is disengaged, the interlocking of said elements being effected when they are in proper registry by swinging said lever in one direction about the axis of one of its pivots, and means for preventing the swinging of said lever about the axis of said pivot when said interlocking means are engaged and said lever is moved to rotate said shaft in either direction.

20. In apparatus of the class described, the combination of an operating lever pivotally mounted to swing about axes at right angles to each other, a shaft to be oscillated, interlocking power transmitting devices, one element of which is carried by said shaft and is movable therewith and the other element of which is carried by said lever and is movable therewith and into and out of engagement with said element carried by said shaft, said lever being free to swing about the axes of its respective pivotal mountings independently of said shaft when said interlocking element is disengaged, a guideway, and a pin carried by said lever and adapted to coöperate with said guideway to guide said lever, there being a given position of said lever in which the registry of said interlocking means may be effected and simultaneously said guide pin positioned for cooperation with said guideway.

21. In apparatus of the character described, the combination with a rotatable member adapted to operate a controller, of a hand operated device, means for supporting said device to swing horizontally on an axis which is substantially in line with the axis of the said rotatable member and also vertically, a detachable connection between said device and said rotatable member adapted for engagement when said device is moved vertically in one direction, whereby the operation of the device horizontally will operate said rotatable member, and means for preventing the separation of said connection during horizontal movement of the device.

22. In apparatus of the character described, the combination with a rotatable member adapted to operate a controller, of a hand operated device, means for supporting said device to swing horizontally and vertically, the pivotal axis of said device being in line with the axis of the said rotatable member, a detachable connection between said device and said rotatable member adapted for engagement when said device is moved vertically in one direction, whereby the operation of the device horizontally will operate said rotatable member, and means for preventing the separation of said connection during horizontal movement of the device, the said means operating to guide the said device during movement.

23. In apparatus of the character described, the combination of a rotatable member adapted to operate a controller, a device adapted to be moved manually, means for supporting said device to swing in horizontal and vertical directions, the pivotal axis of said device being in line with the axis of the rotatable member, detachable means for connecting said device and said movable member together, and means for guiding and controlling the movement of said device.

24. In apparatus of the character described, the combination of a rotatable member adapted to operate a controller, a device adapted to be moved manually, means for supporting said device to swing in horizontal and vertical directions, the pivotal axis of said device being in line with the axis of the rotatable member, detachable means for connecting said device to said movable member, and means for guiding and controlling the movement of said device, said controlling means including a fixed element carried by said device.

25. In apparatus of the character described, the combination of a stationary member and a rotatable member, the said rotatable member being adapted to operate a controller, a lever, means for supporting said lever to swing horizontally and vertically, the pivotal axis of said lever being in line with the axis of the said rotatable member, and co-acting devices between said lever and each of said members arranged for engagement when the lever is in a horizontal position, one of said devices serving to connect the rotatable member to said lever and the other of said devices serving to control the movement of the lever.

26. In apparatus of the character described, the combination of a stationary member and a rotatable member, the said rotatable member being adapted to operate a controller, a lever, means for supporting said lever to swing horizontally and vertically, the pivotal axis of said lever being in line with the axis of said rotatable member, and co-acting devices between said lever and each of said members arranged for engagement when the lever is in a horizontal position, one of said devices serving to connect the rotatable member to said lever and the other of said devices serving to control the movement of the lever, the control devices permitting the engagement of the connecting devices at the starting position of the lever for movement in one direction.

27. In apparatus of the character described, the combination of a stationary member and a rotatable member, the said rotatable member being adapted to operate a controller, a lever, means for supporting said lever to swing horizontally and vertically, the pivotal axis of said lever being in line with the axis of said rotatable member, co-acting devices between said lever and each of said members arranged for engagement when the lever is in a horizontal position, one of said devices serving to connect the rotatable member to said lever and the other of said devices serving to control the movement of the lever, the control devices permitting the engagement of the connecting devices at the starting position of the lever for movement in either direction.

28. In apparatus of the character described, the combination of a stationary member and a rotatable member, the said rotatable member being adapted to operate a controller, a lever, means for supporting said lever to swing horizontally and vertically independently of said rotatable member, the pivotal axis of said lever being in line with the axis of the said rotatable member, and co-acting devices between said lever and each of said members arranged for engagement when the lever is in a horizontal position, one of said devices serving to connect the rotatable member to said lever and the other of said devices serving to control the movement of the lever.

29. In apparatus of the character described, the combination with mechanism to be operated, of a rotatable sleeve or tubular member, operating connections between said sleeve or tubular member and said mechanism, and devices for rotating said sleeve or tubular member, said devices including a handle mounted to swing about the axis of said sleeve or tubular member and movable into operative and non-operative positions and elements for establishing operative relation between said handle and said sleeve or tubular member at a predetermined position when the handle is moved to the operative position, the operative relation between said handle and sleeve or tubular member through said elements being broken by the movement of the handle to the non-operative position.

30. In apparatus of the character described, the combination with mechanism to be operated, of a sleeve or tubular member mounted to rotate on a vertical axis, operating connections between said sleeve or tubular member and said mechanism, and devices for rotating said sleeve or tubular member, said devices including a handle movable about the axis of said sleeve or tubular member and swingable on a horizontal axis into operative and non-operative positions and elements, comprising a slot or opening and a lock receivable therein, for establishing operative relation between said handle and said sleeve or tubular member at a predetermined position when the handle is moved to the operative position, the operative relation between said handle and sleeve or tubular member through said elements being broken by the movement of the handle vertically to the non-operative position.

31. The combination of a stationary member, a rotatable member, operating devices mounted to rotate about the axis of said rotatable member, said devices including a lever pivoted to swing on an axis at right angles to the axis of said rotatable member, and means for connecting said lever to said stationary member and said rotatable member when it is moved about the last mentioned axis in one direction, the connections between the lever and the stationary member permitting said operating devices to rotate about the first mentioned axis.

32. The combination of a stationary member, a member rotatable on a vertical axis, operating devices mounted to rotate about the axis of said rotatable member and adapted to be connected to and disconnected from said rotatable member, said devices including a lever pivoted to swing about a horizontal axis in vertical directions to control the connection between said devices and said rotatable member, and means for connecting said lever to said stationary member when said lever is moved vertically to connect said devices to said rotatable member, the connections between the lever and the stationary member permitting said operating devices to rotate.

In testimony whereof I affix my signature, in the presence of two witnesses.

EMIL GRUENFELDT.

Witnesses:
    WM. E. SCHOLES,
    FRED W. JOHNSON.